R. D. KOHNE.
AGRICULTURAL TRACTOR.
APPLICATION FILED JAN. 29, 1915.

1,227,630.

Patented May 29, 1917.
5 SHEETS—SHEET 4.

WITNESSES:—
R. G. Allen
F. E. Aul

INVENTOR.
Robert D. Kohne,
By Owen, Owen & Crampton
His attys

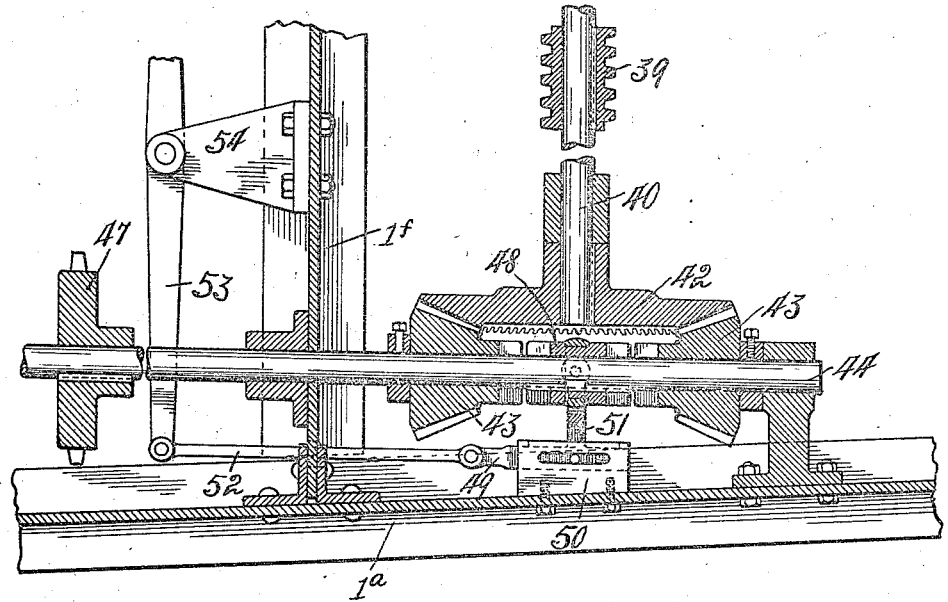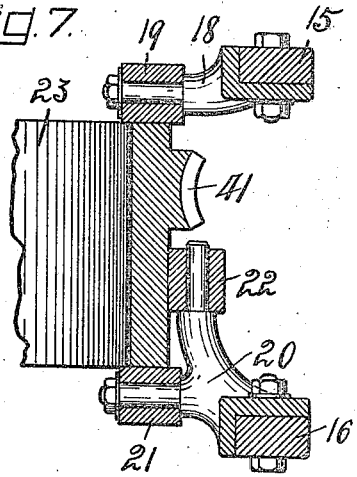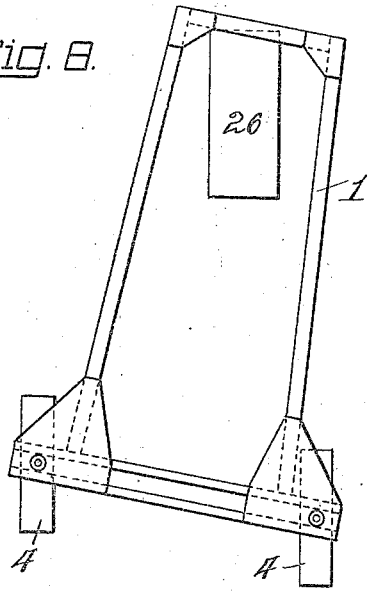

UNITED STATES PATENT OFFICE.

ROBERT D. KOHNE, OF TOLEDO, OHIO.

AGRICULTURAL TRACTOR.

1,227,630.    Specification of Letters Patent.    Patented May 29, 1917.

Application filed January 29, 1915. Serial No. 5,037.

*To all whom it may concern:*

Be it known that I, ROBERT D. KOHNE, a citizen of the United States, and a resident of Toledo, in the county of Lucas and State of Ohio, have invented a certain new and useful Agricultural Tractor; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to tractors of the type adapted more particularly for agricultural work, but is not restricted to use in such connection as it may be used in any connection for which it is adapted or appropriate.

The object of my invention is the provision of a tractor of the character described, which is simple, efficient and comparatively inexpensive in its construction, easy to handle, and capable of being turned practically within its own length, thus admirably adapting it for use in connection with plowing or other agricultural work.

Further objects and advantages of my invention will be apparent from the following detailed description thereof.

The invention is fully described in the following specification, and while, in its broader aspect, it is capable of embodiment in numerous forms, a preferred embodiment thereof is illustrated in the accompanying drawings, in which,—

Figure 1:
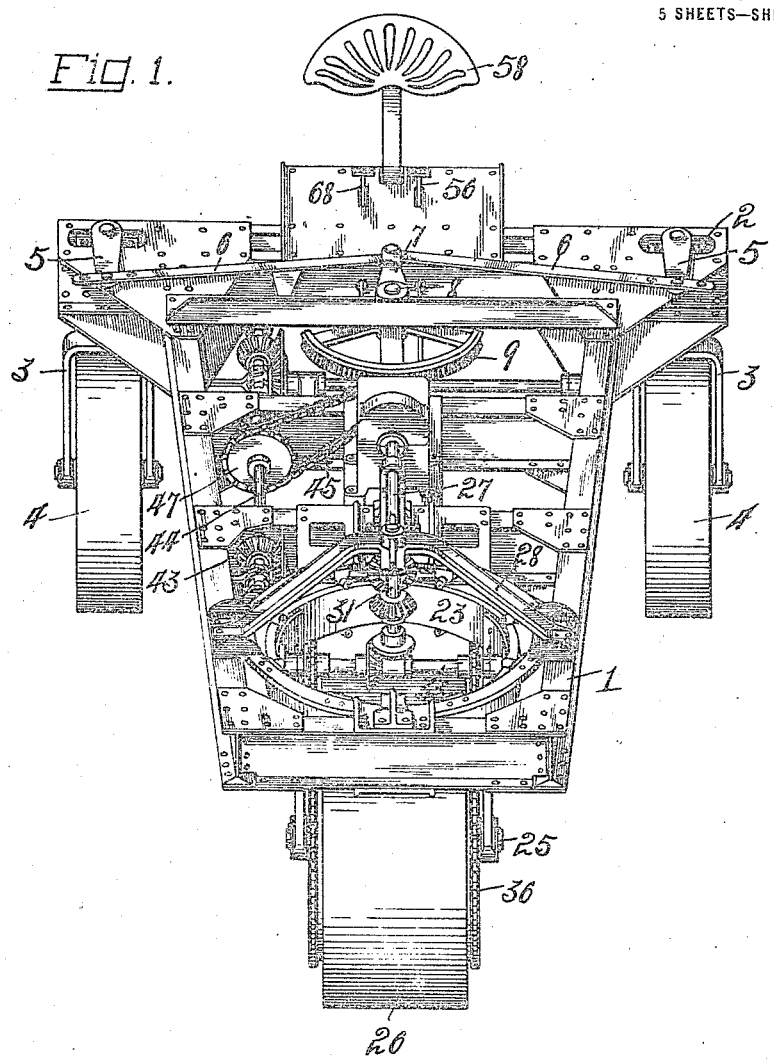
Figure 2:
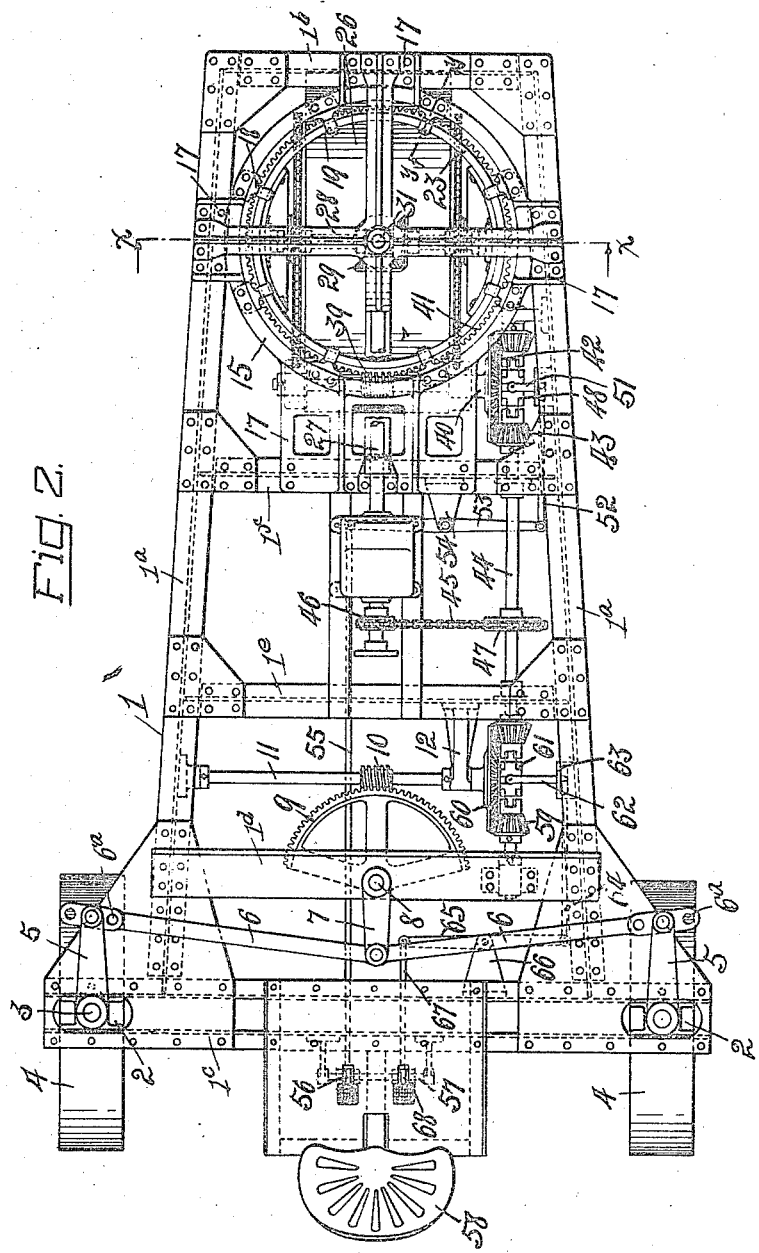
Figure 3:
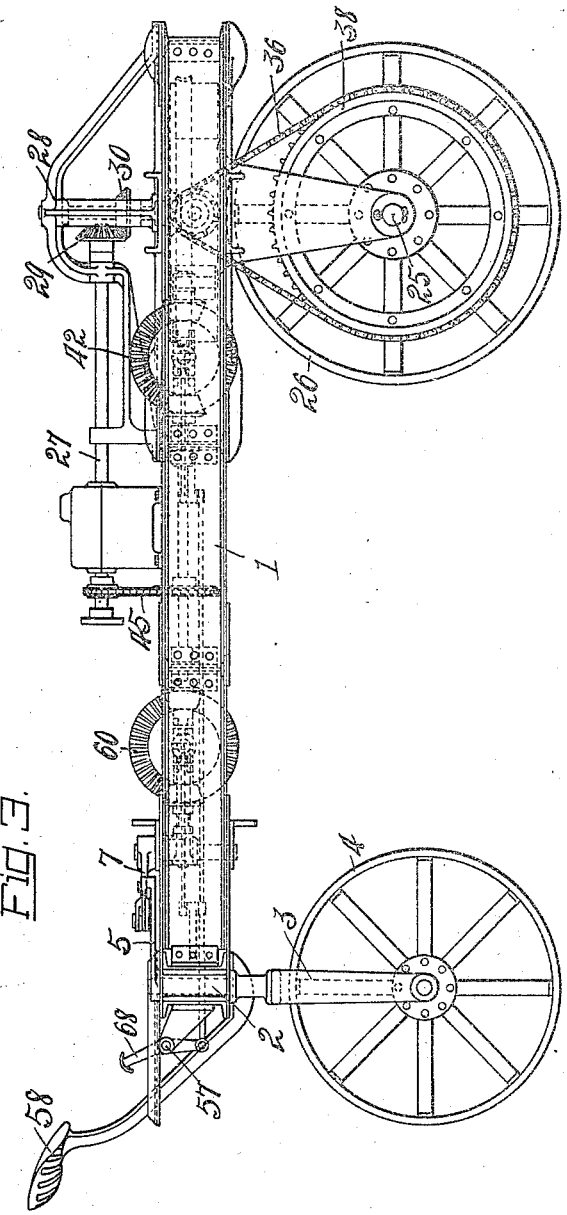
Figure 4:
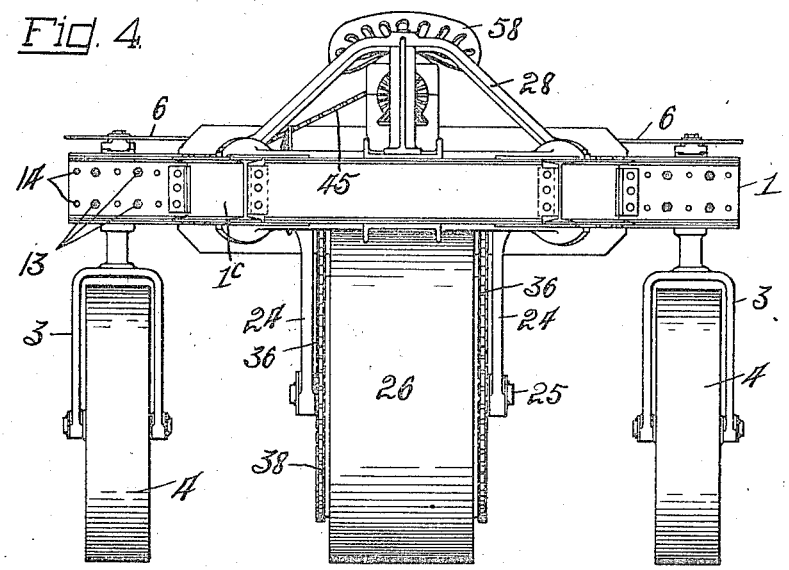
Figure 5:
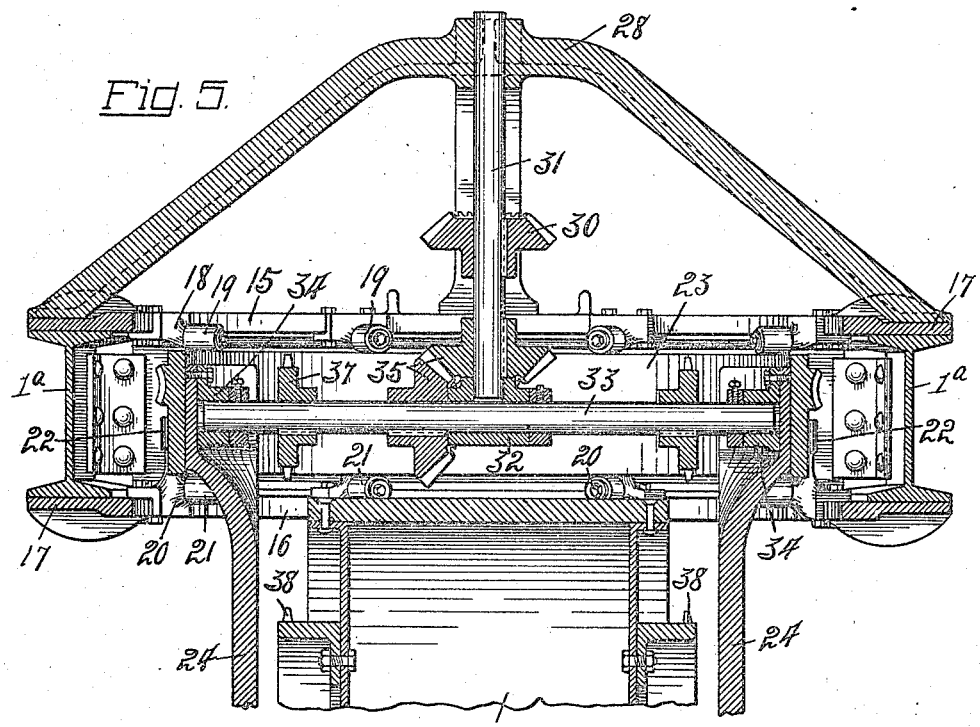

Figure 1 is a top perspective view of a machine embodying my invention. Fig. 2 is a top plan view thereof. Fig. 3 is a side elevation thereof. Fig. 4 is a rear end elevation thereof. Fig. 5 is an enlarged section on the line $x$, $x$ in Fig. 2 with a part broken away. Fig. 6 is an enlarged horizontal section of a portion of the frame and one of the reversing clutches and associated mechanism. Fig. 7 is an enlarged section on the line $y$, $y$ in Fig. 2, and Fig. 8 is a diagrammatical plan view of the frame and wheels of the tractor illustrating the relative positions of the wheels and tractor when it is desired to continue a forward movement of the machine with the front end thereof shifted to one side of the longitudinal center of the machine.

Referring to the drawings, 1 designates the frame of the machine, and comprises the two side beams $1^a$, $1^a$, the front and rear cross beams $1^b$ and $1^c$, respectively, which, together with a plurality of intermediate cross-beams $1^d$, $1^e$ and $1^f$, rigidly connect the side beams in any suitable manner. The frame 1 preferably narrows from its rear end to the front end thereof due to the placing of the side bars $1^a$ in planes which slightly converge with respect to the longitudinal center plane of the machine.

The ends of the rear cross-beams $1^c$ project beyond the respective side beams $1^a$ and are provided with bearings 2 in which the heads of forks 3, carrying caster-wheels 4, are mounted for free turning movements. A crank arm 5 projects forward from the upper end of each fork head, and its free end is pivotally connected to a link 6, which extends crosswise of the frame toward the center thereof and pivotally connects at its inner end to a crank-arm 7, which projects rearward from the upper end of a vertical shaft 8. The shaft 8 is journaled in the cross-bar $1^d$ of the frame and carries a gear segment 9 in mesh with a worm 10 on a cross-shaft 11. The shaft 11 is journaled at one end in a suitable bearing carried by one of the side frame bars $1^a$ and is journaled at its other end in a bearing bracket 12, which projects rearward from the cross frame bar $1^e$. A turning of the shaft 11 in one direction or the other, as hereinafter described, effects a consequent horizontal turning of the caster wheels 4, 4 to assist in directing the course of movement of the tractor.

The bearings 2 are preferably mounted for adjustment transversely of the frame, or longitudinally of the cross-bar $1^c$, and are secured in adjusted position by a set of bolts 13 which project through registering apertures 14 in the respective ends of the cross-bar $1^c$. In Figs. 2 and 4 the bearings 2 are shown as being located in their center positions of adjustment, and may be set at one side or the other of such position, as indicated by the positions of the apertures 14 in Fig. 4. The outer ends of the links 6 are provided with a series of holes $6^a$ corresponding in number and position to the different positions of adjustment of the bearings 2, and adapted to receive the pivot which connects the crank-arms 5 to the links.

Located in the forward end portion of the frame between the frame bars 1ª, 1ª, 1ᵇ and 1ᶠ are a pair of vertically-spaced horizontally-disposed rings 15 and 16, which have bracket arms 17 projecting outward therefrom and securely bolted to the adjacent frame bars, as best shown in Fig. 2. A plurality of brackets 18 are secured to the upper ring 15 and have spindles projecting inward therefrom in radial relation to the ring and carrying anti-friction rollers 19, and a plurality of similar brackets 20 are secured to the lower ring 16 and have spindles projecting inward therefrom in radial relation to the ring and carrying anti-friction rollers 21. The brackets 20 also have spindles projecting vertically therefrom and carry anti-friction rollers 22. A ring 23 of drum-like form is mounted between the sets of rollers 19 and 21 and within the set of rollers 22 for free rotary movements, the rollers 19 and 21 coacting with the respective upper and lower edges thereof and the set of rollers 22 coacting with the outer periphery of the drum. Fixedly secured to and projecting downward from the interior surface of the drum 23 in diametrically disposed relation are a pair of bearing arms 24, 24, which form a fork in the lower ends of which a shaft 25 is mounted. The tractor wheel 26 of the machine is mounted on the shaft 25 between the fork arms 24, 24 and is adapted to have horizontal turning movements with the fork arms when the drum 23 is rotated. The periphery of the tractor wheel 26 is preferably of broad drum-like form, as shown, to adapt it to travel over plowed or soft ground.

The means employed for driving the tractor wheels 26 will now be described. Mounted on the frame 1 to the rear of the rings 15, 16 is a motor (not shown), which is coupled to the shaft 27 that is journaled longitudinally of the frame in suitable bearings provided therefor. The forward end of the shaft 27 is journaled in the rear leg of a four-legged yoke or arch 28, which is disposed over the ring 15 and is securely bolted to the frame. A bevel gear 29 on the forward end of the shaft 27 meshes with and drives a similar gear 30, which is keyed to a vertical shaft 31 within the yoke 28. The upper end of the shaft 31 is journaled in the upper central portion of the yoke 28, and its lower end is journaled in one side of a collar 32, which is loosely mounted on a shaft 33 that is disposed within the drum 23 diametrically thereof and has its ends journaled in suitable bearings 34, which are carried by the drum. A set of bevel-gears 35 on the shafts 31 and 33 communicate rotation from one to the other of said shafts, and such rotation is in turn communicated to the tractor wheel 26 through sprocket-chains 36 that connect sprocket-wheels 37 on the shaft 33 with sprocket-wheels 38 on the respective sides of the tractor wheel 26.

It will be noted that the shaft 31 is disposed in axial relation to the drum 23 and that the bevel-gear drive connection between the shafts 31 and 33 permits a complete turning of the drum 23 within the frame during a driving of the tractor wheel 26, thus enabling the machine to be turned within a space, the dimensions of which are practically equal to the length of the machine. This feature is a very important one in connection with tractors intended to be used for agricultural purposes, as in plowing, cultivating or the like, it is quite essential to be able to turn the machine within a small space.

The turning movements of the drum 23 are effected by the rotating of a worm 39, which is carried by a cross-shaft 40 and meshes with an annular series of teeth 41 on the outer periphery of the drum 23 above the point of coaction of the rollers 22 with the drum. The shaft 40 is journaled in suitable bearings carried by the rear ring arm 17 and carries a large bevel-gear 42 at one end in mesh at opposite sides of its axis with a pair of bevel pinions 43, which are loosely mounted on a shaft 44 that is journaled in the frame 1 lengthwise thereof and adjacent to one of its sides. The shaft 44 is driven from the motor shaft through the medium of a sprocket-chain 45 and sprocket-wheels 46 and 47. A clutch member 48 is feathered to the shaft 44 between the pair of pinions 43 and is shiftable axially of the shaft into clutch engagement with either pinion so that the shaft 40 may be driven in one direction or the other from the shaft 44 depending on which pinion 43 is in clutch engagement with the shaft 44. A slide-bar 49 (Fig. 6) is mounted in a guide 50 for shifting movements longitudinally of the shaft 44 and has an arm 51 projecting transversely therefrom and in engagement with the clutch member 48 to effect a shifting of such member when the slide bar 49 is moved. The slide bar 49 is connected by a link 52 to one end of a lever 53, which extends transversely of the frame and is fulcrumed to a frame bracket 54. The other end of the lever 53 is connected by a rod or link member 55 to a foot lever 56 that is carried by a shaft 57 and located adjacent to the driver's seat 58 at the rear end of the machine, as shown in Figs. 2 and 3.

The worm shaft 11 has a connection with the shaft 44 which is similar to the connection of the shaft 40 therewith, as the shaft 44 has a pair of loose bevel pinions 59 in mesh with a large bevel gear 60 on the shaft 11, and a clutch member 61 is feathered on the shaft 44 between the pinions 59 for movement into clutch engagement with either pinion. The control of the clutch member 61 is also similar to the control of the clutch 48, as the shifting arm 62 for the clutch 61 is guided for sliding movements lengthwise of the frame in a guide member 63 and has connection through a bar 64 with a lever 65. This lever is fulcrumed transversely of the frame to a frame bracket 66 and has one end connected by a link or rod 67 to a foot lever 68 that is mounted on the shaft 57 with the foot lever 56. It is thus evident that the steering movements of the tractor wheel 26 are controlled by movements of the foot lever 56, and that steering movements in unison of the caster wheels 4, 4 are controlled by movements of the foot lever 68.

It will be understood that in the use of my invention, the motor having been started, driving connection may be effected between it and the tractor wheel 26 through the medium of the shaft 27, bevel gears 29, 30, shaft 31, bevel gears 35, shaft 33 and sprocket-wheels and chains 36, 37 and 38, and such driving connection may be continued irrespective of the turning movements of the drum 23. It is also evident that a shifting of the foot lever 56 effects a throwing of the clutch member 48 into clutch connection with one or the other of the pinions 43 and a consequent turning of the drum 23 in the desired direction, and that a shifting of the foot levers 68 will close the driving connection between the shaft 44 and worm shaft 11 through one or the other of the pinions 59 and gear 60, and will accordingly rock the segmental gear 9 and effect a turning in unison of the caster wheels 4, 4. If it is desired to shift the tractor wheel 26 to one side or the other of the normal center line of travel thereof with the machine for the purpose of escaping a row of corn, or the like, which the machine may be straddling, or for any other purpose, such for instance, as enabling the front end of the machine to maintain a position which is closer to a fence than would be possible if the frame were running in straight-ahead position, the tractor and caster wheels are shifted in the same direction to any desired extent, as indicated in Fig. 8, thus causing the frame to assume a position which places its longitudinal center out of parallel relation to the line of travel of the machine. This is an important feature in machines of this character and enables a greater variety of work to be done thereby than would otherwise be the case.

I wish it understood that my invention is not limited to any specific construction, arrangement or form of the parts, as it is capable of numerous modifications without departing from the spirit of the claim.

Having thus described my invention, what I claim as new, and desire to secure by Letters Patent, is,—

A tractor of the class described having a single front tractor wheel and caster wheels mounted for horizontal turning movements, and separate means for imparting horizontal turning movements to said tractor and caster wheels in the same or different directions and for maintaining said wheels in any position of adjustment whereby the tractor may be turned in either direction or may have a straight ahead movement with the wheels traveling in straight parallel lines and with the tractor wheel offset in one direction or another from a line extending centrally between the caster wheels and parallel with the direction of movement thereof.

In testimony whereof, I have hereunto signed my name to this specification in the presence of two subscribing witnesses.

ROBERT D. KOHNE.

Witnesses:
  E. E. THOMAS,
  F. E. AUL.